United States Patent [19]
Arai et al.

[11] Patent Number: 5,160,228
[45] Date of Patent: Nov. 3, 1992

[54] CUTTING TOOL WITH CLAMPED-ON INSERTS

[75] Inventors: Tatsuo Arai; Masaaki Nakayama; Takayoshi Saito, all of Tokyo, Japan

[73] Assignee: Mitsubishi Materials Corporation, Tokyo, Japan

[21] Appl. No.: 677,503

[22] Filed: Mar. 29, 1991

[30] Foreign Application Priority Data

Mar. 30, 1990 [JP] Japan .................................. 2-83732

[51] Int. Cl.$^5$ ................................ A23C 5/22
[52] U.S. Cl. ...................................... 407/32; 407/34; 407/48; 407/103; 408/233
[58] Field of Search .................. 407/34, 48, 103, 104, 407/40, 32, 33, 66; 408/233

[56] References Cited

U.S. PATENT DOCUMENTS

| | | | |
|---|---|---|---|
| 1,027,943 | 5/1912 | Vollmer et al. | 407/45 X |
| 4,009,742 | 3/1977 | Ziegelmeyer | 407/49 X |
| 4,164,380 | 8/1979 | Peters | 407/36 |
| 4,165,947 | 8/1979 | Smids | 407/46 |
| 4,592,680 | 6/1986 | Lindsay | 407/36 |

FOREIGN PATENT DOCUMENTS

| | | |
|---|---|---|
| 054291 | 6/1982 | European Pat. Off. . |
| 2935435 | 3/1981 | Fed. Rep. of Germany . |
| 57-189718 | 11/1982 | Japan . |

*Primary Examiner*—Steven C. Bishop
*Attorney, Agent, or Firm*—Cushman, Darby & Cushman

[57] ABSTRACT

A cutting tool is disclosed which includes a tool body having a plurality of mounting recesses formed on an end thereof. Each of the mounting recesses has a mounting face respectively formed at the bottom thereof. The mounting face has a first threaded hole formed therein. A plurality of inserts are each respectively disposed on the mounting face and secured pressed onto the mounting face by means of a clamping screw screwed into the first threaded hole. The cutting tool is characterized in having a plurality of reduced hardness regions respectively formed under the mounting face inside the tool body, each of the reduced hardness regions having the first threaded hole formed therein, the reduced hardness regions having a hardness lower than the hardness of the tool body.

7 Claims, 8 Drawing Sheets

CUTTING TOOL WITH CLAMPED-ON INSERTS

BACKGROUND OF THE INVENTION

The invention relates to a cutting tool having a plurality of indexable clamped-on "throwaway" tips or inserts releasably secured to an end of a shank or tool body thereof.

Conventional cutting tools with indexable clamped-on "throwaway" tips or inserts are known in shapes of end mill cutting tools as shown in FIGS. 16, 17, and 18.

The end mill cutting tool as shown in the aforesaid figures comprises a tool body 10 of a substantially cylindrical shape having two insert mounting recesses 12 formed at the front end thereof. A threaded hole 16 is formed in a mounting face 14 at the bottom of each of the mounting recesses 12 inwardly into the tool body 10. The cutting tool also includes two inserts 20 of a substantially square shape in plan view, having each thereof disposed on the mounting face 14. Each of the inserts 20 has a mounting hole 34 formed therethrough, through which a clamping screw 30 is screwed into the threaded hole 16, whereby a conical screw head 32 comes into close contact with a tapered face 36 of the mounting hole 34 of the insert 20, and each of the inserts 20 is secured pressed onto the mounting recess 12.

The mounting recess 12 has two side walls or abutment faces 42, 44, both of which are formed so as to have slanted faces when screwed in, the clamping screw 30 presses two sides 22, 24 of the insert 20 which have a complementary slant face, in close contact with the abutment faces 42, 44 respectively, whereby cutting edges 46 are positioned both in axial and radial directions of the cutting tool or the tool body 10. Thus, the value of deviation in the axial direction "x" and the value of deviation in the radial direction "y" of each of the cutting edges are determined.

In order to achieve a precision cutting using the aforesaid cutting tool, it is essential to maintain these deviation values "x" and "y" of each cutting edge in conformity with each other with high accuracy. Therefore, it is necessary to maintain the sides 22, 24 of the insert 20 securely in close contact with the abutment faces 42, 44 respectively. For this purpose, the cutting tool is formed in the following manner: (1) the abutment faces 42, 44 of the mounting recess 12 are precision-machined so as to secure, in predetermined accuracy, the distance $\alpha_1$ between the abutment face 44 and the front end surface of the tool body 10 and the distance $\beta_1$ between the abutment face 44 and the axis of rotation $O_1$ of the tool body 10; (2) the distances between the abutment faces 42, 44 and the center of the threaded hole 16, namely $\alpha_2$ and $\beta_2$ respectively, are made slightly shorter than the distances between the sides 22, 24 of the insert 20 and the center of the mounting hole 34 of the insert 20, namely $\alpha_3$ and $\beta_3$ respectively, so as to provide predetermined tightening margins $\delta_1(=\alpha_3-\alpha_2)$ and $\delta_2(=\beta_3-\beta_2)$ for the insert 20.

With these tightening margins, $\delta_1$ and $\delta_2$, the centerline $O_2$ of the clamping screw 30 is not colinear the centerline $O_3$ of the mounting holes 34 toward the abutment faces 42, 44, whereby the insert 20 is pressed against the abutment faces 42, 44 as the conical head 32 of the clamping screw 30 presses a tapered side 36 of the mounting hole 34 when the insert 30 is mounted. Consequently, the sides 22, 24 of the insert 20 come securely in close contact with the abutment faces 42, 44 respectively to secure the aforesaid deviation values "x" and "y".

However, conventional cutting tools with "throwaway" inserts as aforesaid have had difficulty in securing both the accuracy of machining of the abutment faces 42, 44 of the mounting recess and the accuracy for the tightening margins for the insert 20 at the same time, because of heat treatment of the tool body 10.

The tool body 10 of the aforesaid cutting tool is usually heat treated to a relatively high hardness of 43-70 on the Rockwell C hardness scale. Threaded holes 16 cannot be formed in a material of this hardness, and therefore threaded holes must be formed before the heat treatment. Thus, the position of the threaded hole 16 inevitably tends to be incorrect due to distortion caused by the heat treatment.

On the other hand, because of the necessity of removing distortions caused by heat treatments, the abutment faces 42, 44 must be specially machine-finished according to the extent of distortion following the heat treatment.

Subsequently, if the abutment faces 42, 44 are machine-finished with priority given to the distance $\alpha_1$ between the abutment face 42 and the front end surface of the tool body 10, and the distance $\beta_1$ between the abutment face 44 and the axis of rotation $O_1$ of the tool body, then the distances $\alpha_2, \beta_2$ between the threaded hole 16 and the abutment faces 42, 44 become erroneous and the tightening margins $\delta_1, \delta_2$ tend to vary. Alternatively, if the abutment faces 42, 44 are machine-finished with priority given to the distances $\alpha_2, \beta_2$ between the threaded hole 16 and the abutment faces 42, 44, then the aforesaid distances $\alpha_1, \beta_1$ become erroneous and the deviation values "x" and "y" tend to vary. Consequently, in either case, the tool accuracy is adversely affected.

In order to eliminate the aforesaid disadvantage, an alternative arrangement has been introduced wherein (1) when heat treating the tool body 10, the hardness thereof is limited to a relatively low value of the Rockwell C number in the range of 30-40 so as to enabling the threaded hole 16 to be formed; (2) after heat treating, the abutment faces 42, 44 are firstly machine-finished to secure the accuracy for the distances $\alpha_1, \beta_2$ to the front end surface and to the axis of rotation $O_1$ of the tool body 10 respectively; then (3) the threaded hole 16 is formed with reference to the finished abutment faces 42, 44 to secure the accuracy for the distances $\alpha_2$, and $\beta_2$; consequently (4) the accuracies for the aforesaid deviation values "x" and "y" and the insert tightening margins $\delta_1$, and $\delta_2$ are secured. This alternative, however, has the disadvantage that the hardness of the tool body 10 is absolutely insufficient, which results in remarkable damage to the tool body by chip abrasion and a shorter tool life.

SUMMARY OF THE INVENTION

It is therefore an object of the present invention to provide a cutting tool in which the threaded holes for mounting the inserts are easily formed in the tool body after the hardening process so that both machine-finishing of the mounting recesses and the formation of the threaded holes can be performed to the predetermined accuracy, whereby the adverse influence of the distortion caused by the hardening process is prevented, and both the accuracy for insert tightening margins and the accuracy for deviation values of the cutting edges are secured at the same time.

According to the present invention, there is provided a cutting tool comprising a tool body having a plurality of mounting recesses formed on an end thereof, each of the mounting recesses having a mounting face respectively formed at the bottom thereof, the mounting face having a first threaded hole formed therein; a plurality of inserts, each respectively disposed on the mounting face and secured pressedly onto the mounting face by means of a clamping screw screwed into the first threaded hole; the cutting tool characterized by a plurality of reduced hardness regions respectively formed under the mounting face inside the tool body, each of the reduced hardness regions having the first threaded hole formed therein, the reduced hardness regions having a hardness lower than the hardness of the tool body.

Thus, in the cutting tool of the present invention, the first threaded hole for the clamping screw is arranged to be formed in each of the reduced hardness regions having a hardness lower than the tool body. Therefore, the first threaded hole can be formed after a heat treatment, in which the tool body is hardened to a hardness which is too hard for a threaded hole to be formed (without any difficulty otherwise encountered as in the case of the aforesaid conventional cutting tool) as the reduced hardness region is formed under the mounting face.

Therefore, in the cutting tool of the present invention, the accuracy for the position of each of the first threaded holes is secured with reference to reference faces of the mounting recesses machine-finished after heat treating. Consequently, the position of cutting edges of each insert is kept from varying, thus a cutting tool of high accuracy is obtained. In addition, the abrasion resistance of the tool body is enhanced by heat treating the tool body to a high hardness, and tool life is thereby extended.

DESCRIPTION OF THE PREFERRED EMBODIMENTS OF THE INVENTION

Figure 1:
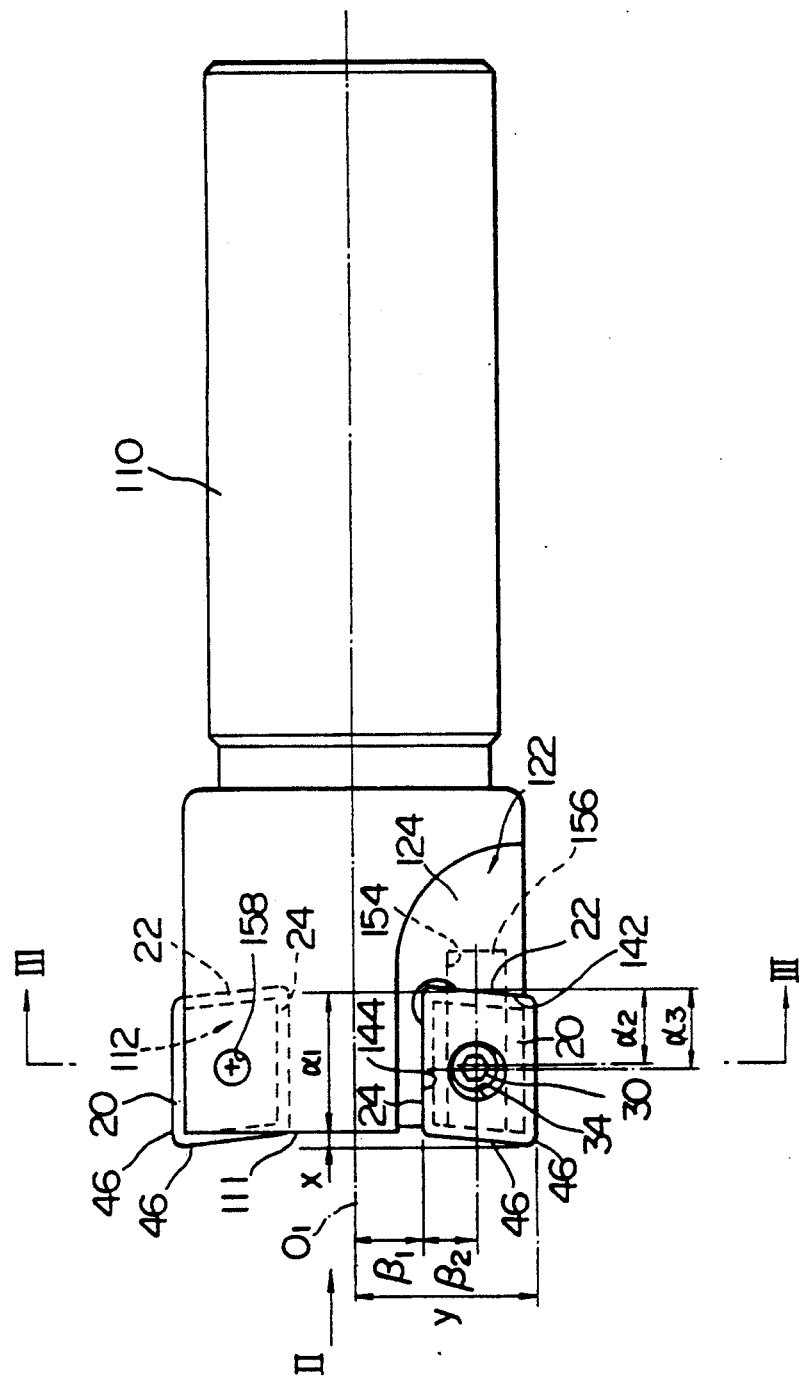
FIG. 1 is a plan view of an end mill cutting tool in accordance with a first embodiment of the present invention.
Figure 2:
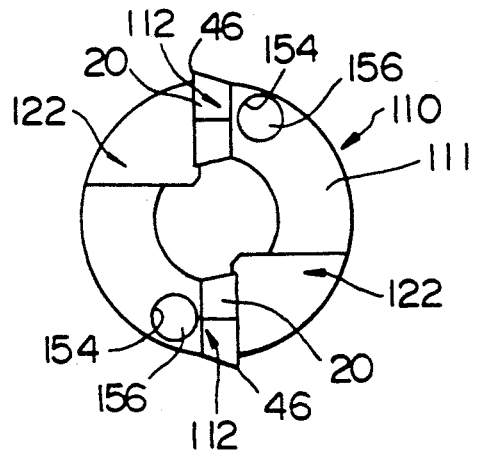
FIG. 2 is an end view of the cutting tool of FIG. 1 seen in the direction indicated by the arrow II in FIG. 1.
Figure 3:
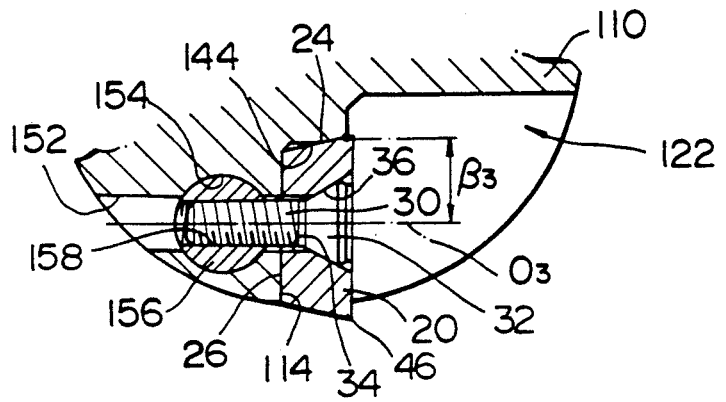
FIG. 3 is a cross-sectional view of the cutting tool of FIG. 1 taken along the line III—III in FIG. 1.
Figure 4:
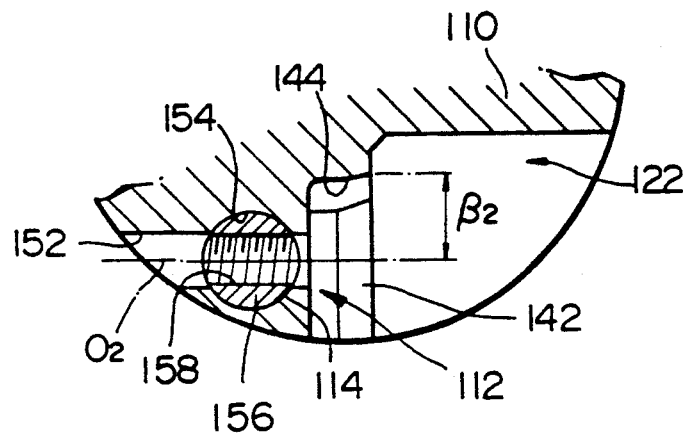
FIG. 4 is a cross-sectional view of the cutting tool of FIG. 1 taken along the line III—III in FIG. 2, with the insert and the clamping screw removed.

FIGS. 1 to 4 depict an end mill cutting tool in accordance with a first embodiment of the invention, in which the same parts as those of the aforesaid conventional cutting tool are designated by the same numerals to avoid a duplication of explanation.

As shown in FIGS. 1 to 4, the end mill cutting tool of the present embodiment comprises a tool body 110 having two insert mounting recesses 112 formed at the front end thereof. Two inserts 20 of a substantially square shape formed of cemented carbide are securely clamped onto the mounting recesses 112 by means of clamping screws 30.

The aforesaid tool body 110 has a substantially cylindrical shape formed of steel having hardenability such as machine and structural carbon steel and heat-treated to a relatively high hardness of 43–70 on the Rockwell C hardness scale. The tool body 110 has two insert pockets 122 formed at the front end thereof. Each of the insert pockets 122 has openings at the front end and a circumferential side. Each of the insert pockets 122 having a mounting recess 112 respectively formed at the front end of a wall 124 of the insert pocket 122 facing forwardly in the direction of rotation of said tool body 110.

Similarly to the aforesaid conventional cutting tool, the insert mounting recess 112 has a mounting face 114 to be in close contact with the bottom surface 26 of the insert 20, and slanted walls or abutment faces 142, 144 to be in close contact with two sides 22, 24 of the insert 20. Each of the abutment faces 142, 144 is machine-finished by grinding to predetermined distances $\alpha_1$, and $\beta_1$ with reference to the front end surface 111 and the axis of rotation $O_1$ of the tool body 110 after the tool body 110 is heat-treated. A through-hole 152 is formed in the mounting face 114 of the mounting recess 112 inwardly into and through the tool body 110 out to the peripheral surface of the tool body 110. A straight hole 154 is formed under the mounting face 114 in the front end surface 111 of the tool body 110 extending inwardly into the tool body 110 across the through-hole 152. The straight hole 154 has a reduced hardness member of right cylindrical shape 156 disposed therein.

The right cylindrical column 156 has a relatively low hardness of 30–40 on the Rockwell C hardness scale, and is drive-fitted into the straight hole 154 after the tool body 110 is quench-hardened. The right cylindrical column 156 has a threaded hole 158 formed therein to engage with the clamping screw 30. The distances between the abutment faces 142, 144 and the center $O_2$ of the threaded hole 158, namely $\alpha_2$ and $\beta_2$ respectively, are made slightly shorter than the distances between the sides 22, 24 of the insert 20 and the center $O_3$ of the mounting hole 34 of the insert 20, namely $\alpha_3$ and $\beta_3$ respectively.

In the cutting tool of the aforesaid arrangement, similarly to the aforesaid conventional cutting tool, the distances between the abutment faces 142, 144 and the center $O_2$ of the threaded hole 158, namely $\alpha_2$ and $\beta_2$ respectively, are made slightly shorter than the distances between the sides 22, 24 of the insert 20 and the center $O_3$ of the mounting hole 34 of the insert 20, namely $\alpha_3$ and $\beta_3$ respectively. Thus, the conical head 32 of the clamping screw 30 is pressed onto a tapered side 36 of the mounting hole 34 by screwing the clamping screw 30 into the threaded hole 158 through the mounting hole 34 of the insert 20. Then, the insert 20 is pressed against the abutment faces 142, 144 by having the conical head 32 of the clamping screw 30 pressed onto a tapered side 36 of the mounting hole 34, whereby cutting edges 46 are positioned both in axial and radial directions of the cutting tool or the tool body 10.

In the cutting tool of the present embodiment, the first threaded hole for the clamping screw is arranged to be formed in the right cylindrical column 156 having a hardness lower than the tool body 110. Therefore, the first threaded hole 158 can be formed after heat treatment, in which the tool body is hardened to a hardness which is too hard for a threaded hole to be formed (without any difficulty otherwise encountered as in the case of the aforesaid conventional cutting tool) as the right cylindrical column 156 is drive-fitted into the straight hole 154 of the tool body after the heat treatment.

Therefore, in the cutting tool of the present embodiment, the accuracy for the aforesaid distances $\alpha_1$, $\beta_1$, $\alpha_2$ and $\beta_2$ are all secured in the following manner: (1) after heat treating, the abutment faces 142, 144 are firstly machine-finished with reference to the front end surface 111 and the axis of rotation $O_1$ of the tool body 110 respectively; then (2) the first threaded hole 158 is formed with reference to the finished abutment faces 142, 144. Consequently the aforesaid deviation values "x" and "y" and the insert tightening margins $\delta_1(=\alpha_3-\alpha_2)$ and $\delta_2(=\beta_3-\beta_2)$ are kept from varying, thus a cutting tool of high accuracy is obtained. In addition, the abrasion resistance of the tool body 110 is enhanced by heat-treating the tool body 110 to a high hardness, and tool life is thereby extended.

Figure 5:
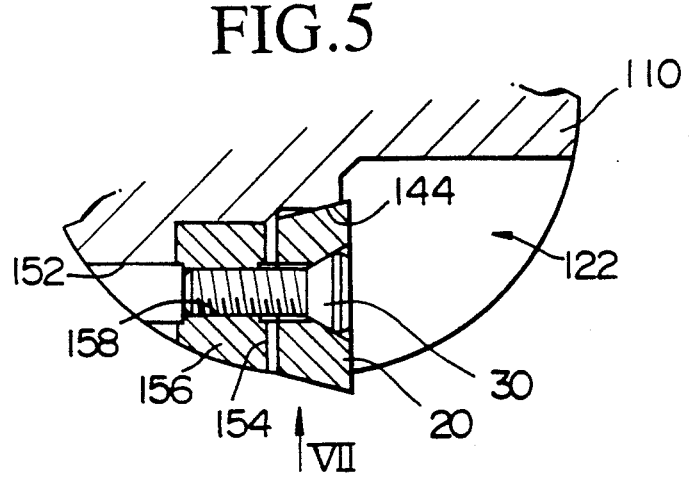
FIG. 5 is a cross-sectional view of a cutting tool in accordance with a second embodiment of the present invention.
Figure 6:
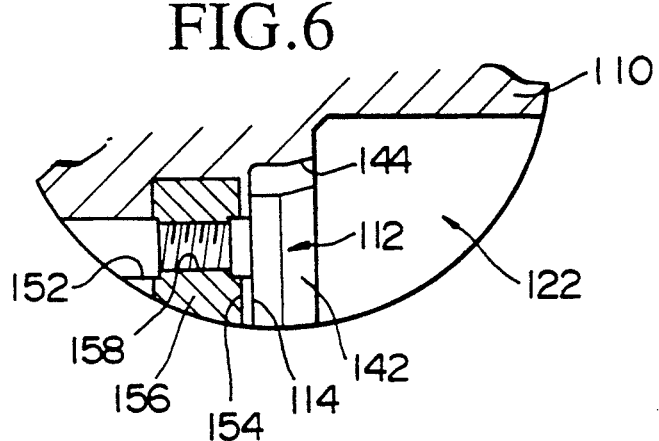
FIG. 6 is a cross-sectional view of the cutting tool of FIG. 5, with the insert and the clamping screw removed.
Figure 7:
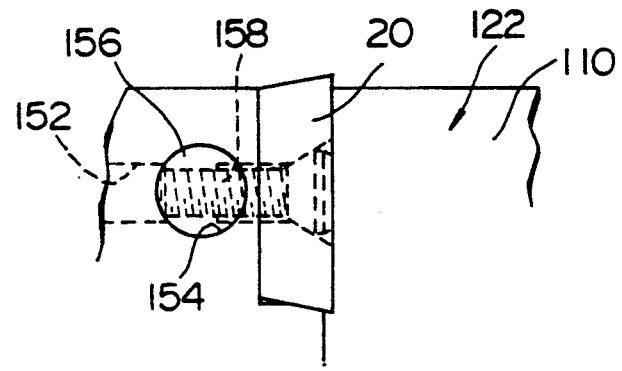
FIG. 7 is a bottom view of the cutting tool of FIG. 5 seen in the direction indicated by the arrow VII in FIG. 5.

FIGS. 5 to 7 depict another cutting tool in accordance with a second embodiment of the invention, in which the straight hole 154 is formed in the circumferential surface at the front end of the tool body 110 inwardly into the tool body 110, and the right cylindrical column 156 of reduced hardness is drive-fitted into the straight hole 154, instead of the straight hole 154 formed in the front end surface 111 of the tool body 110 inwardly into the tool body 110 and the right cylindrical column 156 drive-fitted into the straight hole 154 in the axial direction of the tool body 110.

Figure 8:
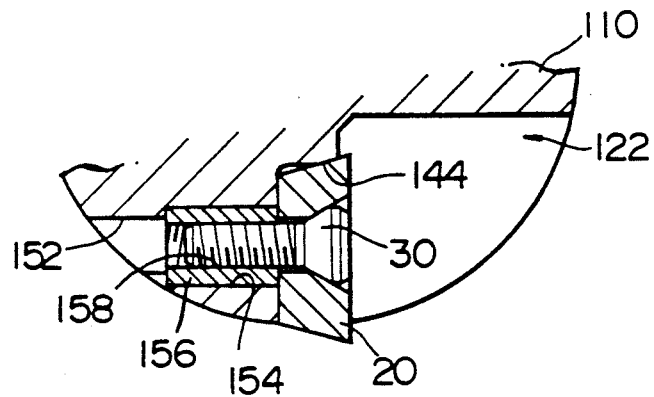
FIG. 8 is a cross-sectional view of a cutting tool in accordance with a further embodiment of the present invention.
Figure 9:
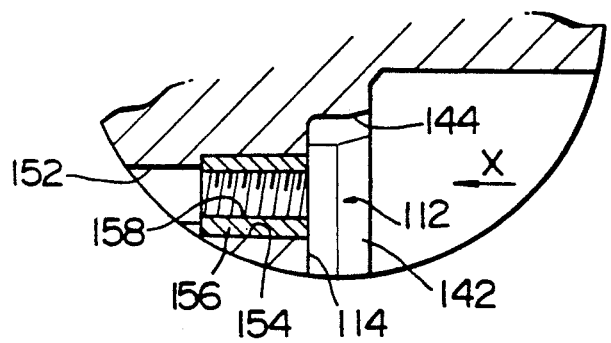
FIG. 9 is a cross-sectional view of the cutting tool of FIG. 8, with the insert and the clamping screw removed.
Figure 10:
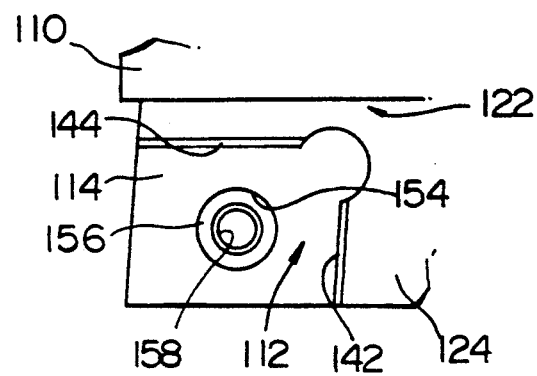
FIG. 10 is a side elevational view of the cutting tool of FIG. 9 seen in the direction indicated by the arrow X in FIG. 9.

FIGS. 8 to 10 depict yet another cutting tool in accordance with a further embodiment of the invention, in which the straight hole 154 is formed in said mounting face 114 extending coaxially with said longitudinal axis of said first threaded hole 158 and inwardly into said tool body 110.

In the aforesaid embodiments, the right cylindrical column 156 of reduced hardness is drive-fitted into the straight hole 154 of the tool body 110 after the heat-treatment of the tool body 110. However, if the right cylindrical column 156 is formed of material of low hardenability, the right cylindrical column 156 may be drive-fitted into the straight hole 154 of the tool body 110 before the heat treatment because the right cylindrical column 156 itself is not hardened after the heat-treatment and the same advantages according to the principle of the present invention is obtained, as described above.

Further, as a modification of the drive-fitting method for securing the right cylindrical column 156 to the straight hole 154, the right cylindrical column 156 may be secured to the straight hole 154 or the tool body 110 by means of brazing or other securing method, instead of drive-fitting.

Furthermore, as shown in FIGS. 11 to 14, a (second) threaded hole 162 may be formed into the tool body 110 instead of the straight hole 154, and a circumferentially threaded column 157 may be used as a reduced hardness member and removably screwed into the second threaded hole 162 instead of the right cylindrical column permanently secured to the straight hole 154, as variations of the aforesaid embodiments of the present invention.

Figure 11:
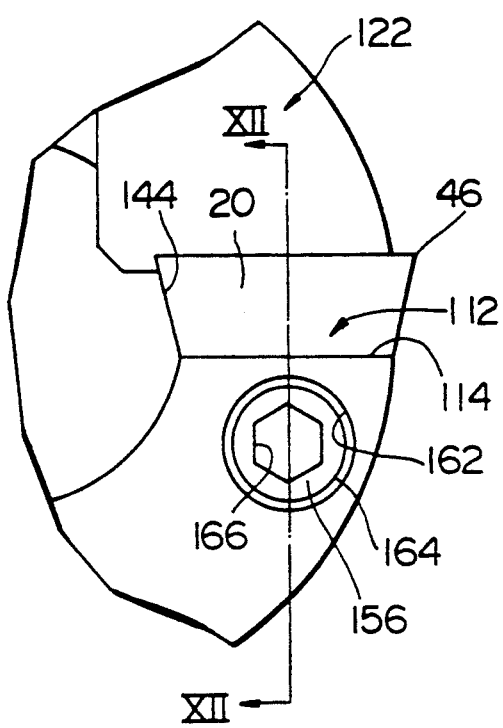
FIG. 11 is a partial end view of a cutting tool in accordance with another embodiment of the present invention.
Figure 12:
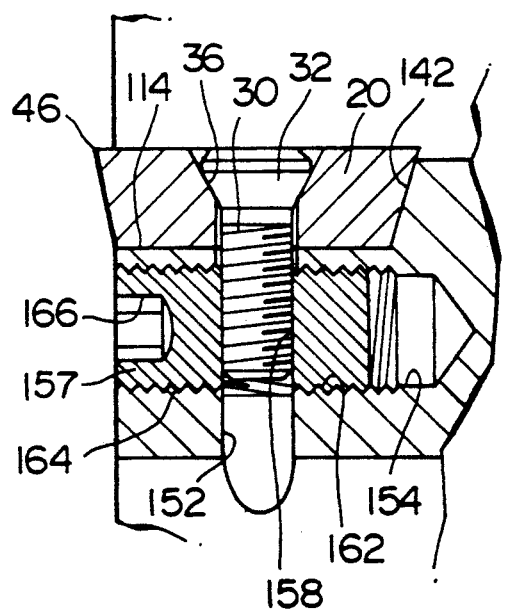
FIG. 12 is a cross-sectional view of the cutting tool of FIG. 11 taken along the line XII—XII in FIG. 11.

In case of removably threading the threaded column 157 into position as the reduced hardness member, an advantage is provided if, for example, the clamping screw 30 is torn off at its cap 32 because of loss of the insert 20 and threaded portion of the clamping screw 30 remains inside the threaded hole 158, the threaded column 157 is removed from the tool body 110 and a replacement column 157 is screwed into position, and a new threaded hole 158 is formed, whereby the original state of insert-clamping mechanism is easily restored. Also included in the advantage is that maintenance work for the threaded hole 158 is likely made easy in case, for example, a threading tap is broken while forming the threaded hole 158, or the threaded hole 158 itself is damaged for some reason. When using this removable engagement of threaded column and hole, methods of handling or turning the threaded column 157 may be improved in that, for example, as shown in FIGS. 11 and 12, a hexagonal recess 166 matching a hexagonal head wrench (not shown) is formed at the outside end of the threaded column 157.

Figure 13:
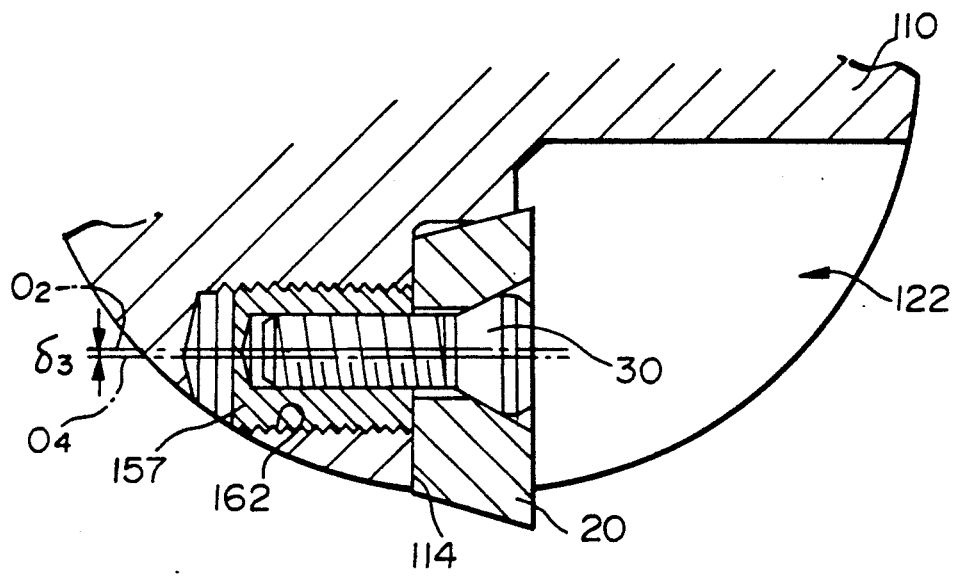
FIG. 13 is a cross-sectional view of a cutting tool in accordance with another embodiment of the present invention.
Figure 14:
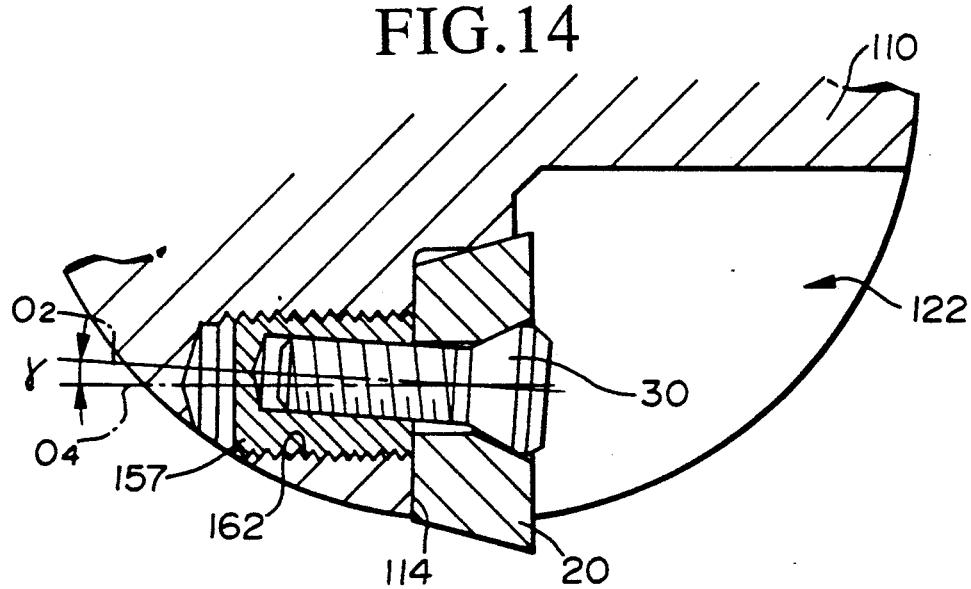
FIG. 14 is a cross-sectional view showing a modification of the cutting tool of FIG. 13.
Figure 15:
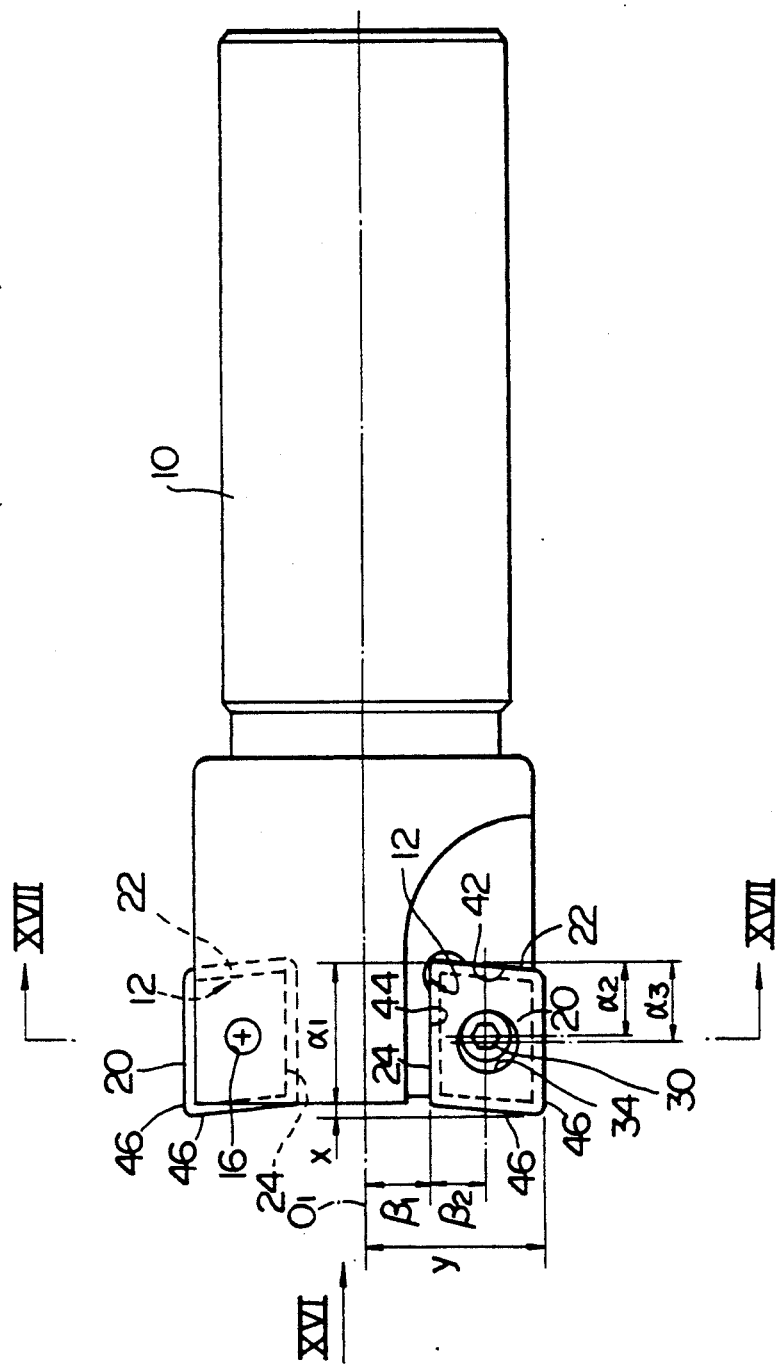
FIG. 15 is a plan view of a conventional cutting tool.
Figure 16:
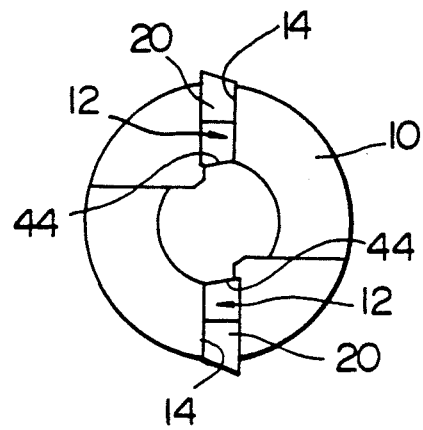
FIG. 16 is an end view of the cutting tool of FIG. 15 seen in the direction indicated by the arrow XVI in FIG. 15.
Figure 17:
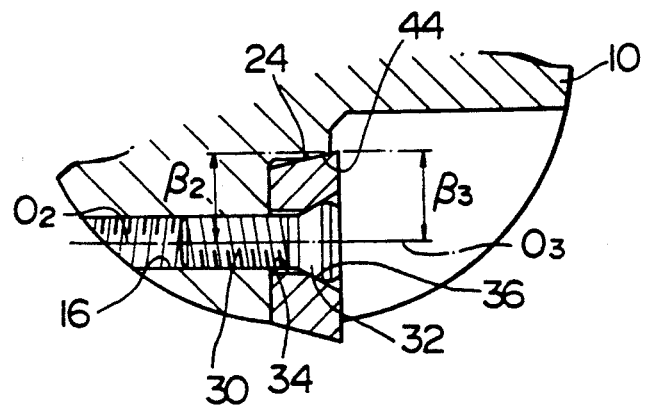
FIG. 17 is a cross-sectional view of the cutting tool of FIG. 15 taken along the line XVII—XVII in FIG. 15.

Also, when the threaded column 157 and the (second) threaded hole 162 are used coaxially positioned with the (first) threaded hole 158 for the clamping screw 30, as shown in FIGS. 13 and 14, consideration may be advantageously given that the centerline $O_4$ of the second threaded hole 162 is positioned slightly displaced in parallel by "$\delta_3$" (FIG. 13) or slightly angularly inclined by an angle of "$\gamma$" (FIG. 14) with respect to the centerline $O_4$ of the first threaded hole 158 in order to avoid the possibility of co-turning and subsequent undesired loosening of the clamping screw 30 and the threaded column 157.

As a further embodiment of the present invention, instead of embedding a reduced hardness member permanently or removably into the tool body 110, a reduced hardness region may be formed by applying a hardening-proof medium to an area around the mounting face 114 where the first threaded hole 158 is to be formed, whereby the first threaded hole 158 can be formed after a hardening process for the tool body 110, and the same effect is provided as the aforesaid embodiments.

In the aforesaid embodiments, description has been made with reference to the end mill cutting tools. However, it is understood that the present invention can be employed to other various cutting tools such as facing mills and facing tools, and is not to be limited by the descriptions of the above embodiments; those skilled in the art will appreciate that various modifications of the present invention may be made without departing from the spirit and scope of the present invention as claimed in the claims.

What is claimed is:

1. A cutting tool comprising:
   a tool body having a plurality of mounting recesses formed on an end thereof, each of said mounting recesses having a mounting face respectively formed at the bottom thereof, said mounting face having a first threaded hole formed therein;
   a plurality of inserts, each respectively disposed on said mounting face and secured pressedly onto said mounting face by means of a clamping screw screwed into said first threaded hole, and
   a plurality of reduced hardness regions respectively formed under said mounting face inside said tool body, each of said reduced hardness regions having said first threaded hole formed therein, said reduced hardness regions having a hardness lower than the hardness of said tool body,
   each of said reduced hardness regions including a reduced hardness member having a hardness after treatment in a hardening process lower than a hardness of said tool body after the hardening process, said reduced hardness members embeddedly disposed under said mounting face inside said tool body before the hardening process.

2. A cutting tool according to claim 1, wherein:
   said reduced hardness member is a right cylindrical column, and said tool body has a plurality of straight holes of round cross-section formed axially inwardly in a front end surface of said end of said tool body, each of said straight holes having said right cylindrical column respectively drivefitted therein before said hardening process for said tool body; and
   said mounting face respectively has a through-hole formed therein extending inwardly into said tool body across said straight hole, thereby enabling a clamping screw to be screwed into said first threaded hole in said reduced hardness region through said through hole in said mounting face.

3. A cutting tool according to claim 2, wherein each of said straight holes has said right cylindrical columns secured therein by brazing.

4. A cutting tool comprising:
   a tool body having a plurality of mounting recesses formed on an end thereof, each of said mounting recesses having a mounting face respectively formed at the bottom thereof, said mounting face having a first threaded hole formed therein;
   a plurality of inserts, each respectively disposed on said mounting face and pressedly secured onto said mounting face by means of a clamping screw screwed into said first threaded hole, and
   a plurality of reduced hardness regions respectively formed under said mounting face inside said tool body, each of said reduced hardness regions having said first threaded hole formed therein, said reduced hardness regions having a hardness lower than the hardness of said tool body,
   said reduced hardness region comprises a reduced hardness member having a hardness lower than the hardness of said tool body after a hardening process for said tool body, said reduced hardness member embeddedly disposed under said mounting face inside said tool body after said hardening process,
   said reduced hardness member being a right cylindrical column, and said tool body having a plurality of straight holes of round cross section formed chordally inwardly into the circumferential surface of said end of said tool body, each of said straight holes having said right cylindrical column respectively drive-fitted therein after said tool body is hardened,
   each of said plurality of straight holes of round cross section being respectively formed in said mounting face extending axially with said longitudinal axis of said first threaded hole and inwardly into said tool body.

5. A cutting tool according to claim 4, wherein each of said straight holes has said right cylindrical columns secured therein by brazing.

6. A cutting tool comprising:
   a tool body having a plurality of mounting recesses formed on an end thereof, each of said mounting recesses having a mounting face respectively formed at the bottom thereof, said mounting face having a first threaded hole formed therein;
   a plurality of inserts, each respectively disposed on said mounting face and secured pressedly onto said mounting face by means of a clamping screw screwed into said first threaded hole, and
   a plurality of reduced hardness regions respectively formed under said mounting face inside said tool body, each of said reduced hardness regions having said first threaded hole formed therein, said reduced hardness regions having a hardness lower than the hardness of said tool body,
   said reduced hardness member being a circumferentially threaded column, and said tool body having a plurality of second threaded holes formed axially inwardly in and into the front end surface of said end of said tool body before said hardening process, whereby said threaded column being respectively removably engaged with each of said second threaded holes after said tool body is hardened, each of said second threaded holes having the longitudinal axis thereof crossed with the longitudinal axis of said first threaded hole;
   said mounting face respectively having a through-hole formed therein extending inwardly into said tool body across each of said second threaded holes, thereby enabling said clamping screw to be screwed into said first threaded hole in said reduced hardness region through said through-hole in said mounting face.

7. A cutting tool comprising:
   a tool body having a plurality of mounting recesses formed on an end thereof, each of said mounting recesses having a mounting face respectively formed at the bottom thereof, said mounting face having a first threaded hole formed therein;
   a plurality of inserts, each respectively disposed on said mounting face and secured pressedly onto said mounting face by means of a clamping screw screwed into said first threaded hole, and
   a plurality of reduced hardness regions respectively formed under said mounting face inside said tool body, each of said reduced hardness regions having said first threaded hole formed therein, said reduced hardness regions having a hardness lower than the hardness of said tool body, said reduced hardness region being formed by applying a hardening-proof medium to an area around said mounting face containing a portion where said first threaded hole is to be formed, thereby enabling said first threaded hole to be formed after a hardening process for said tool body.

* * * * *